United States Patent
Van Wiemeersch et al.

(10) Patent No.: US 12,115,936 B2
(45) Date of Patent: Oct. 15, 2024

(54) BIOMETRIC WIRELESS VEHICLE ENTRY SYSTEM

(71) Applicant: Ford Global Technologies, LLC, Dearborn, MI (US)

(72) Inventors: John Robert Van Wiemeersch, Novi, MI (US); Ali Hassani, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 148 days.

(21) Appl. No.: 17/661,479

(22) Filed: Apr. 29, 2022

(65) Prior Publication Data

US 2022/0258695 A1 Aug. 18, 2022

Related U.S. Application Data

(63) Continuation-in-part of application No. 17/061,113, filed on Oct. 1, 2020, now Pat. No. 11,321,576.

(51) Int. Cl.
*B60R 25/25* (2013.01)
*G07C 9/00* (2020.01)
*G07C 9/37* (2020.01)

(52) U.S. Cl.
CPC .......... *B60R 25/25* (2013.01); *G07C 9/00309* (2013.01); *G07C 9/37* (2020.01); *B60R 2325/103* (2013.01); *G07C 2009/00634* (2013.01); *G07C 2009/00769* (2013.01)

(58) Field of Classification Search
CPC ..... B60R 25/257; B60R 25/25; B60R 25/252; B60R 25/23; G07C 9/00563; G07C 9/00309; G07C 9/37; G06V 40/1365; G06V 40/50; G06V 40/171; G06V 40/172
See application file for complete search history.

(56) References Cited

U.S. PATENT DOCUMENTS

| | | | |
|---|---|---|---|
| 9,852,562 B2* | 12/2017 | Belhadia | H04W 4/80 |
| 2006/0142071 A1* | 6/2006 | Stephens | H04M 1/23 |
| | | | 455/90.3 |
| 2006/0186987 A1* | 8/2006 | Wilkins | B60R 25/252 |
| | | | 340/5.6 |
| 2010/0180321 A1* | 7/2010 | Graeber | G06F 21/554 |
| | | | 726/4 |
| 2011/0226849 A1* | 9/2011 | Padilla | G06K 7/0004 |
| | | | 235/382 |

(Continued)

*Primary Examiner* — Yong Hang Jiang
(74) *Attorney, Agent, or Firm* — Frank Lollo; Eversheds Sutherland (US) LLP

(57) ABSTRACT

A distributed biometric vehicle entry system is configured to provide personalized biometric authentication for vehicle entry. The system utilizes an authentication token private key challenge generated a biometric wireless vehicle entry keypad, or a passive device such as a smartphone or fob, such that it would be insufficient for an intruder to simply jump the circuit with an external battery. The biometric authentication may be localized to an embedded system within the biometric vehicle entry keypad, and may be self-contained from all other vehicle systems with a wireless vehicle interface and independent power supply. The vehicle may grant access responsive to receiving the authentication token (and only the authentication token) whenever a valid biometric signature is recognized.

13 Claims, 8 Drawing Sheets

(56) References Cited

U.S. PATENT DOCUMENTS

| | | | |
|---|---|---|---|
| 2013/0260689 A1* | 10/2013 | Haverinen | H04B 5/0037 |
| | | | 455/41.2 |
| 2014/0338409 A1* | 11/2014 | Kraus | B60R 25/23 |
| | | | 70/278.1 |
| 2016/0371907 A1* | 12/2016 | Ma | E05B 81/80 |
| 2019/0190718 A1* | 6/2019 | Wease | H04L 9/3242 |
| 2020/0219341 A1* | 7/2020 | Khalid | G07C 9/00896 |
| 2020/0291676 A1* | 9/2020 | Shah | G07C 9/00563 |
| 2022/0198863 A1* | 6/2022 | Ho | G07C 9/37 |

\* cited by examiner

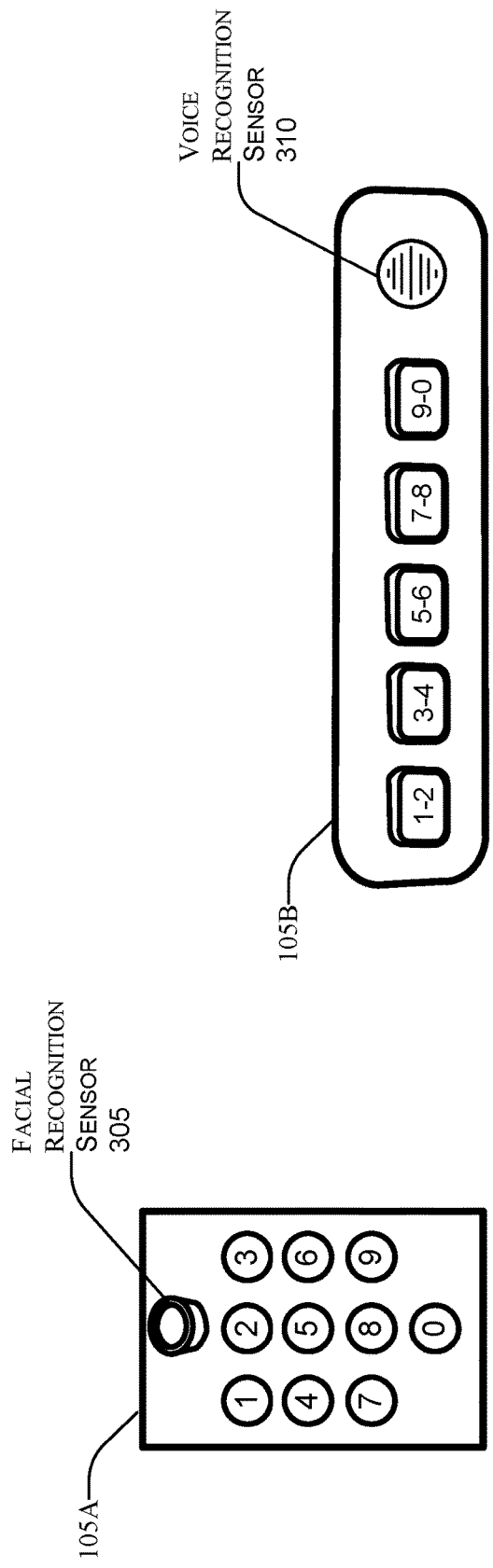
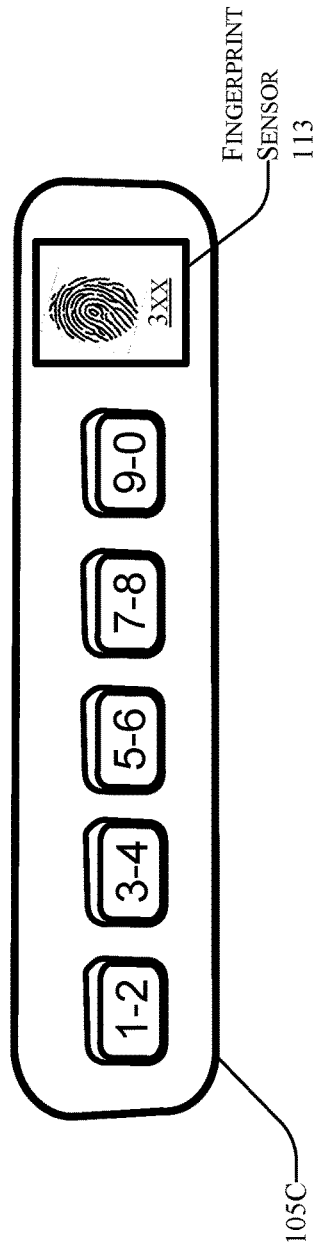
FIG. 3A
FIG. 3B
FIG. 3C

BIOMETRIC WIRELESS VEHICLE ENTRY SYSTEM

CROSS-REFERENCE TO RELATED APPLICATIONS

The present application is a continuation-in-part of and claims priority to and the benefit of U.S. application Ser. No. 17/061,113, filed Oct. 1, 2020, which is hereby incorporated by reference herein in its entirety.

TECHNICAL FIELD

The present disclosure relates to vehicle entry systems, and more particularly, to an enhanced security biometric vehicle entry system.

BACKGROUND

There are two primary issues and challenges associated with providing device-free vehicle access: security and privacy. Conventional approaches may enhance security for remote entry, passive entry, and device-less vehicle entry at the expense of user privacy, where personally identifiable information may be at risk. In other aspects, conventional systems that make user privacy paramount may not offer security features that guard against signal spoofing and other methods of attack. Moreover, systems that utilize biometric data for user authentication may introduce unique security issues in connection with the biometric information as well as the security of the vehicle itself.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 3A-3C illustrate example biometric vehicle entry wireless keypads in accordance with the present disclosure.

DETAILED DESCRIPTION

Overview

Figure 1:
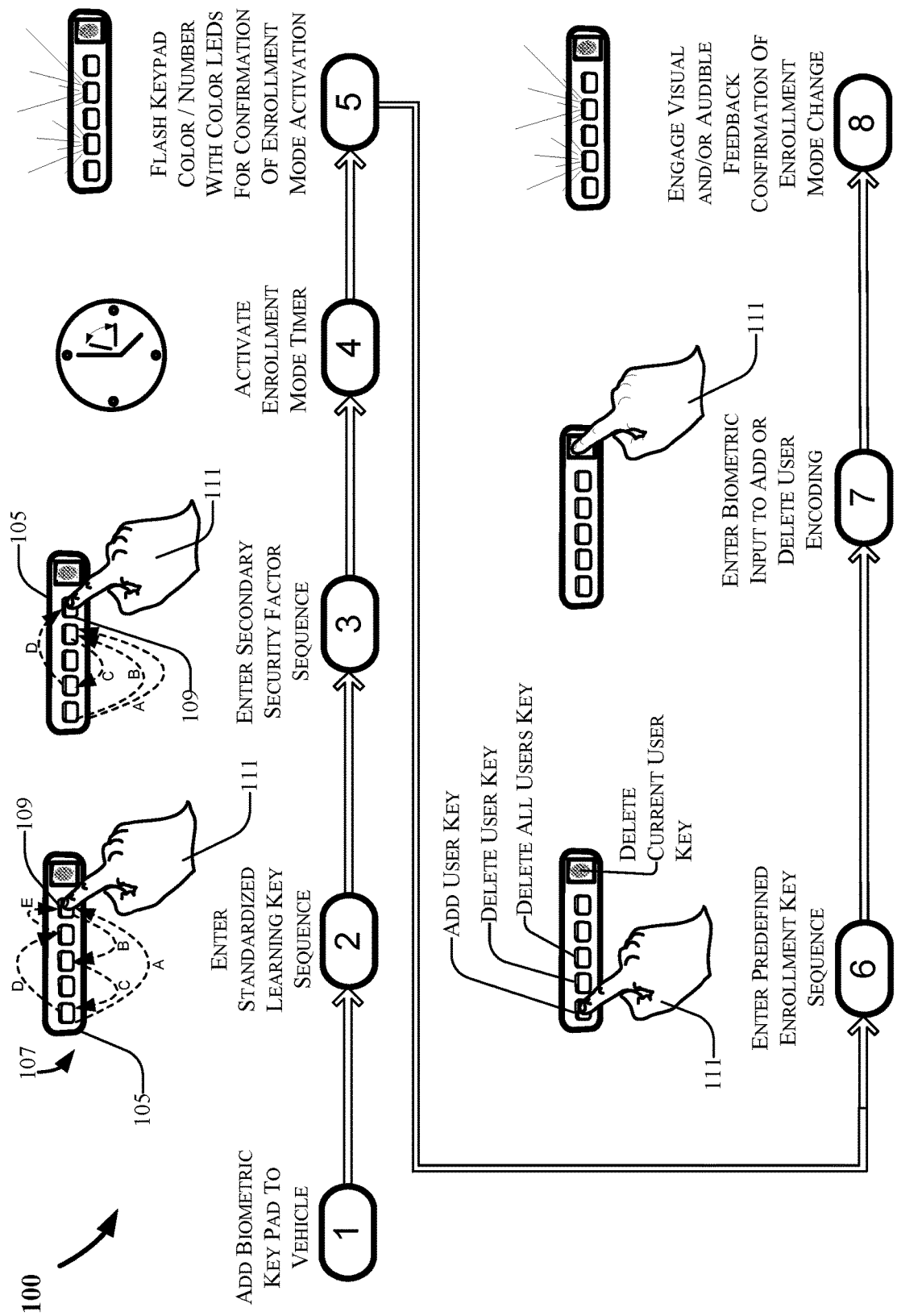
FIG. 1 illustrates an example user enrollment or unenrollment procedure using a biometric vehicle entry system in accordance with the present disclosure.

The systems and methods disclosed herein are configured and/or programmed for vehicle Fob-free Entry and Ignition (FEI) using biometric authentication. The biometric vehicle entry system authenticates a user via a wireless keypad using a biometric input mechanism to enable an unlock/lock functionality through a passive fob device embedded in the vehicle. The biometric vehicle entry system may localize the vehicle for security purposes, and grant physical and operative access to the vehicle responsive to authenticated transmission of a token generated from the wireless keypad. The biometric vehicle entry system can include a start button configured and/or programmed to trigger an embedded vehicle key fob integrated with the wireless keypad.

The disclosed systems and methods provide a localized biometric wireless entry system that maintains user privacy without compromising vehicle security. The biometric vehicle entry system can be easily retrofitted at a dealership, or added and programmed by users without additional vehicle changes. These and other advantages of the present disclosure are provided in greater detail herein.

The systems and methods may also include the use of a second keypad that may mount on top of (or otherwise interface with with) an existing vehicle entry keypad (for example, a keypad that is integrated into the B-Pillar of the vehicle). This second keypad may also provide the capability for users to access a vehicle using either a traditional numbered keypad ("numerical pad") or biometrics (and/or other methods, such as through the use of a near-field communication (NFC) card).

In traditional vehicle keypad entry systems, the user enters a code into the keypad to gain access to the vehicle. In the systems and methods described herein, however, the second keypad is mounted on top of the existing vehicle keypad, so the user may not be able to directly interact with the existing vehicle keypad. Given this, the inputs provided by a user to the numerical pad of the second keypad may be reproduced on the existing keypad so that the vehicle may be able to recognize the inputs provided to the second keypad. This may be accomplished in a number of different ways. For example, the code that is entered into the numerical pad of the second keypad may be electrically reproduced on the surface of the existing keypad integrated into the vehicle. As a second example, the numeric pad of the second keypad may comprise a flexible material that may physically deflect and touch the existing keypad capacitive keys with a conductive material. The inputs provided to the second keypad may also be reproduced on the existing keypad through any other suitable mechanism as well.

In one or more embodiments, the inputs provided by a user to the biometrics portion of the second keypad may also be reproduced on the existing keypad. This may be accomplished, for example, by changing the connectivity on circuits resting on the existing keypad, and electronically generating the code for the existing keypad via the conductive circuits designed over each of the numerical buttons on the existing keypad to simulate a user code input. Conductivity may be switched on and off. The type of biometric input that is used (for example, print, facial, voice, etc.) may vary depending on the power source that is used for the second keypad.

In one or more embodiments, the second keypad may be constructed from flexible plastics for the housing and circuit board to be able to match the curvature of the vehicle B-Pillar. However, the second keypad may also be constructed from any other type of material as well. The second keypad may be powered through any number of different methods. For example, the keypad may harvest energy from an NFC transceiver that may be included with the existing keypad. As a second example, the keypad may include one or more coin cell batteries (and/or any other types of batteries). As a third example, the keypad may include solar cells and and/or a solid-state power storage device. As a fourth example, the keypad may harvest energy from the any light emitting diodes (LEDs) on the pre-existing keypad on the B-Pillar of the vehicle. The LEDs could be kept "on" when the car is running to charge the second keypad.

Illustrative Embodiments

The disclosure will be described more fully hereinafter with reference to the accompanying drawings, in which example embodiments of the disclosure are shown, and not intended to be limiting.

Embodiments describe a biometric vehicle entry system configured and/or programmed as a distributed system to provide personalized biometric authentication for vehicle entry that includes a private key challenge such as an authentication token generated from the biometric vehicle entry wireless keypad, and/or in some example embodiments, a passive device such as a smartphone or other smart device, such that it would be insufficient for an intruder to simply jump the circuit with an external battery. The biometric authentication may, in some embodiments, be localized to an embedded system within the biometric vehicle entry keypad that is self-contained from all other vehicle systems, where the vehicle may grant access responsive to transmission of the authentication token (and only the authentication token) whenever a valid biometric signature is recognized.

FIG. 1 illustrates an example user enrollment/unenrollment procedure 100 using a biometric wireless vehicle entry system 107, in accordance with the present disclosure. The example user enrollment/unenrollment procedure 100 may include adding the biometric wireless keypad 105 to the vehicle (such as, for example, the vehicle 205 as described in greater detail with respect to FIG. 2). The following steps 2-8 provide an example scenario for programming the biometric wireless keypad 105, once disposed on an exterior surface of the vehicle 205, to authenticate a new user, and/or delete one or more existing users that have previously established secure key code(s) using the biometric wireless keypad 105.

It should be appreciated that, although depicted in FIG. 1 as a fingerprint sensor-enabled keypad, as explained in the following sections, the biometric wireless keypad 105 may include hardware and processing capability to process other forms of biometric authentication data, including facial recognition, voice recognition, iris recognition, ear geometry recognition, hand geometry recognition, and gait recognition, to name a few. Although disposed on a vehicle door (as shown in FIG. 1) it should be appreciated that the biometric wireless keypad 105 may be disposed on any vehicle surface accessible from the exterior of the vehicle. Moreover, the biometric wireless keypad 105 horizontally, vertically, and/or at any angular variation (e.g., diagonal, etc.).

In other aspects, the biometric wireless keypad 105 may be mounted anywhere on an exterior surface of the vehicle, and/or on an interior surface of the vehicle. In one aspect, a user may leave the vehicle unlocked, where the biometric wireless keypad 105 is accessible by the user for vehicle starting events. As another example, since many vehicles may already include an external keypad, it may be advantageous in some applications to mount the biometric wireless keypad 105 on an interior surface (e.g., in the vehicle cabin) for the ignition event, where the user is able to utilize their unique access code for the entry event.

Embodiments of the present disclosure describe a system that can include an aftermarket biometric keypad configured and/or programmed to operate as part of the biometric wireless vehicle entry system 107. In other aspects, the system 107 may include an original equipment manufacturer (OEM) integrated biometric vehicle entry wireless keypad that is installed on the vehicle 205 (not shown in FIG. 1) during an initial purchase of the vehicle from a dealership. In either case, the user enrollment/unenrollment procedure 100 may continue at step 2 with entry of a standardized learning key sequence.

The learning key sequence may be standardized such that the learning key is hardcoded to a key microprocessor (not shown in FIG. 1) for security. Entry of a correct standardized learning key sequence may place the biometric wireless keypad 105 into a learning/enrollment mode that allows a user 111 to enroll new users into the biometric vehicle entry system 107, and delete some or all previously-enrolled users from the system. The standardized key sequence may be associated with a first code set that can include, for example, a five-digit key code illustrated in Step 2 as key presses A, B, C, D, and E. It should be appreciated that specific key press sequences and the specific numbers of keys associated with enrollment and unenrollment steps illustrated in FIG. 1 and described in the following sections are provided as examples only, and may not represent actual key code sequences and/or lengths of key codes that are possible. For example, although described as a 5-digit standardized learning key sequence in FIG. 1, other key sequence lengths are possible.

At Step 2, the user 111 may enter the standardized learning key sequence as a first factor authentication that, when entered, places the biometric wireless keypad 105 into a learning/enrollment mode. The learning/enrollment mode may allow a user to add (enroll) and remove (unenroll) biometric vehicle keys associated with individual users.

In some example embodiments, the biometric wireless vehicle entry system 107 may require a secondary security factor sequence, which may include a secondary security code set, which may also be hard coded in the key microprocessor. An example key microprocessor is discussed hereafter with respect to FIG. 4. The secondary security code may include a longer key code length (e.g., 7 digits) than the standardized learning key sequence to add an additional level of security that prevents or mitigates attempted misuse. Moreover, as explained in the following sections, entering the standardized learning key sequence (Step 2) and entering the secondary security factor sequence (Step 3) may be accomplished in alternative ways, including, for example, communicating with the biometric wireless vehicle entry system 107 via a smartphone by downloading an application such as FordPass® or similar application associated with the vehicle 205, and following an enrollment procedure using the smartphone application by confirming user ownership of the vehicle with a cloud-based server (not shown in FIG. 1), scanning a QR code (not shown in FIG. 1) associated with the biometric wireless keypad 105, and performing a bonded communication pairing procedure using the application. For example, The FordPass application can configure the enrollment/revoke requests. In one example embodiment, the FordPass application may connect with the biometric wireless keypad 107 keypad, wher a user can request to add a new wireless keypad (e.g., the biometric wireless keypad 107) in their FordPass account, and scan a QR code on the back of the keypad to transmit the enrollment codes wirelessly, or enter the pair of codes to configure enrollment mode. Proper initiation of enrollment mode would also pair the keypad to the mobile device, and therefore FordPass account.

In another aspect, the biometric wireless vehicle entry system 107 may determine whether the vehicle is localized in a predetermined geographic location by receiving information from the vehicle Global Positioning System (GPS) system indicative of a location for the vehicle. For example, the vehicle may be localized in a predetermined location, and/or within a threshold distance from the location. Responsive to determining that the vehicle is localized in an expected programming zone, the biometric wireless vehicle entry system 107 may permit the bonded communication pairing procedure using the application.

At step 4, after correct entry of the secondary security factor sequence, the biometric wireless vehicle entry system 107 may activate an enrollment mode timer that places the biometric wireless vehicle entry system 107 in enrollment mode for a predetermined period of time (e.g., 15 seconds, 30 seconds, one minute, etc.). Accordingly, the subsequent steps 5-8 would be performed before the end of the predetermined time period measured by the enrollment mode timer. In some aspects, the predetermined time period may allow the BLE (Bluetooth Low Energy) transceiver and/or UHF (Ultra High Frequency) transceiver to communicate with the vehicle or mobile device. In some aspects, enrollment may be done on a start button disposed on a vehicle interior control panel (e.g., in the cabin), where the extracted features are cryptographically secured and transmitted to the wireless keypad via BLE/Bluetooth.

At step 5, responsive to successful activation of the enrollment mode timer, the biometric wireless vehicle entry system 107 may flash one or more light emitting diodes (LEDs) associated with the biometric wireless keypad 105. By illuminating one or more keypad lights, the biometric wireless vehicle entry system 107 may indicate the start of entry into the enrollment mode and the timer therefor. In one embodiment, one or more particular colors may light to indicate successful entry into enrollment mode, or a second color may flash when the entry of the standardized learning key sequence and/or the secondary security factor sequence were unsuccessfully entered. In another aspect, the biometric wireless keypad 105 may include sound output means, and may sound a chime or other alert associated with successful and/or unsuccessful entry of the codes. The enrollment may be synchronized with a smart HMI or done on the vehicle interior using a start button. Smart HMI may be either on a mobile device application display (e.g., FordPass) or displayed on a Sync display, where enrollment states are communicated wirelessly (e.g. using Bluetooth/BLE).

At Step 6, the user enrollment/unenrollment procedure 100 may further include entering a predefined enrollment key sequence to indicate the enrollment or unenrollment procedure intended. For example, a first key may be associated with adding a new user, where depressing the key configures and/or programs the biometric wireless vehicle entry system 107 to receive an enrollment control code for adding a new user biometric input in the following steps. In another aspect, a second key may configure and/or program the biometric wireless vehicle entry system 107 for receiving a second enrollment control code for deleting a user biometric input. For example, the delete current user key may be actuation of a fingerprint sensor 113 disposed on a face of the biometric wireless keypad 105, such that the user simply places a finger on the keypad after selecting the delete user key to delete the current user. In another example, particular user keys may be selectively deleted using a sequential press of one or more buttons (e.g., two presses of a key deletes user 2, three presses of a key deletes user 3, etc.). In a third aspect, a third key may be configured and/or programmed to delete all user keys, such that actuation of the third key triggers a subsequent confirmation step (not shown in FIG. 1) that, when confirmed by completion of the step, deletes all active users.

At Step 7, a biometric input may be entered into the biometric wireless vehicle system 107. In one embodiment, the biometric input may be a fingerprint received via the fingerprint sensor 113. In other aspects, the biometric input may take another form, such as one or more image frames that include a user face, ear, or other feature such as a hand for assessment of its biometric landmarks. In another aspect, the biometric input may be a voice input. In yet another example, the biometric input may be user gait detection obtained using a vehicle perception system (not shown in FIG. 1), which may be processed using a vehicle controller or other means and transmitted to the biometric wireless keypad 105.

At Step 8, the biometric wireless vehicle entry system 107 may engage visual and/or audible feedback confirmation of the enrollment mode change. For example, the biometric wireless keypad 105 may generate an acknowledgement of entering the learning mode by flashing one or more mesh button illumination feeds (RGB LEDs that may result in yellow flashes, or a monochrome LED flash or series of flashes of a single color). In other aspects, an external wireless communication interface (not shown in FIG. 1) disposed in bonded communication with the biometric wireless keypad 105 may generate an output indicating successful enrollment, unenrollment, and code changes.

Figure 2:
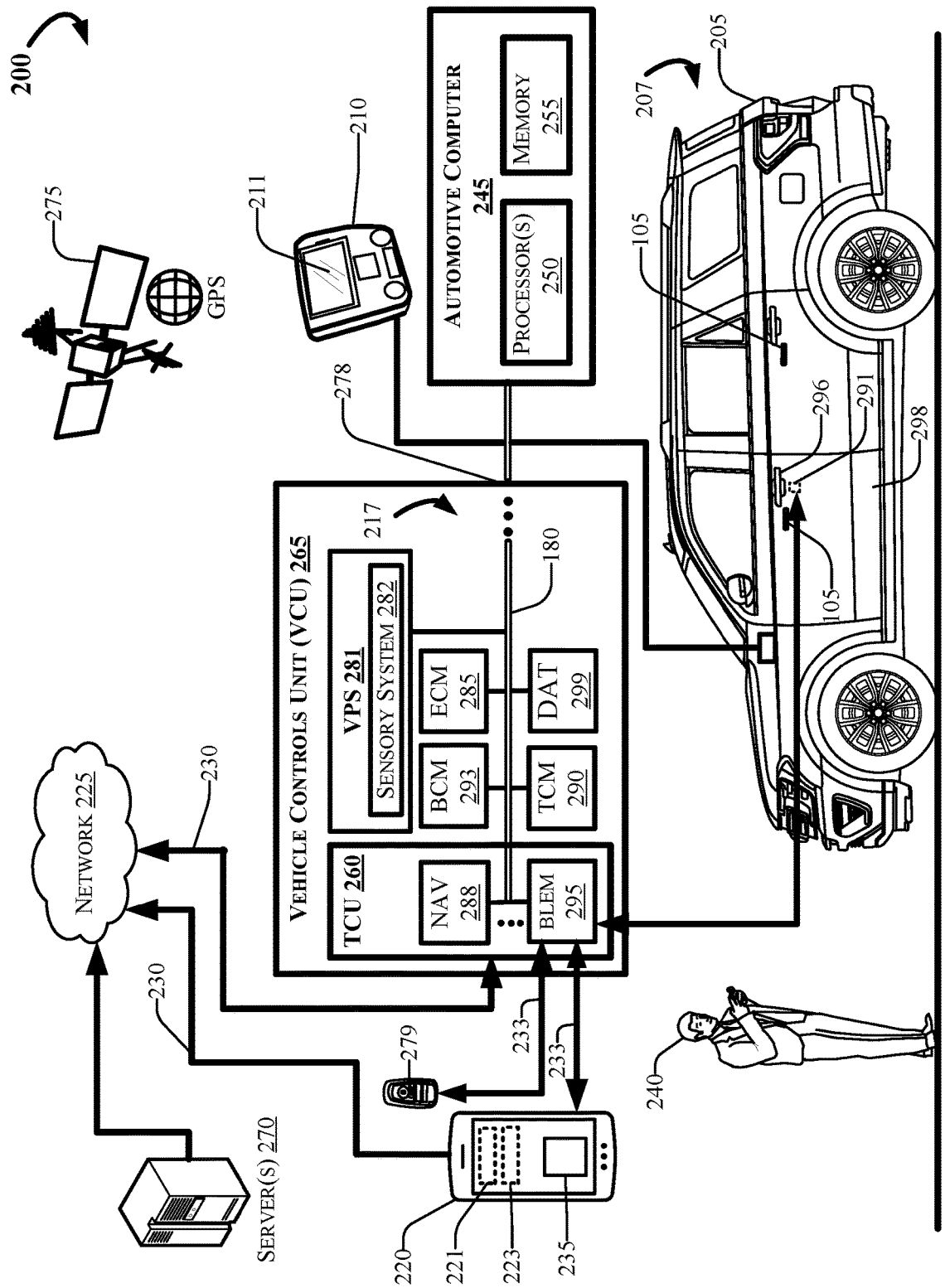
FIG. 2 depicts an example computing environment in which techniques and structures for providing the systems and methods disclosed herein may be implemented.

The following figures describe an example architecture of further methods for use that include user enrollment and unenrollment using the biometric wireless vehicle entry system 107. FIG. 2 depicts an example computing environment 200 that can include such a vehicle 205. The vehicle 205 may include an automotive computer 245, a Vehicle Controls Unit (VCU) 265 that can include a plurality of electronic control units (ECUs) 217 disposed in communication with the automotive computer 245, and one or more biometric wireless keypads 105. A mobile device 220, which may be associated with a user 240 and the vehicle 205, may connect with the automotive computer 245 using wired and/or wireless communication protocols and transceivers. The mobile device 220 may be communicatively coupled with the vehicle 205 via one or more network(s) 225, which may communicate via one or more wireless connection(s) 230, and/or may connect with the vehicle 205 directly using near field communication (NFC) protocols, Bluetooth® protocols, Wi-Fi, Ultra-Wide Band (UWB), and other possible data connection and sharing techniques.

The vehicle 205 may also receive and/or be in communication with the GPS 275. The GPS 275 may be a satellite system (as depicted in FIG. 2) such as the global navigation satellite system (GLONASS), Galileo, or navigation or other similar system. In other aspects, the GPS 275 may be a terrestrial-based navigation network. In some embodiments, the vehicle 205 may utilize a combination of GPS and Dead Reckoning responsive to determining that a threshold number of satellites are not recognized. In other aspects, the vehicle may receive a signal from the GPS 275 for localizing the vehicle, to determine whether the vehicle is within a geo-bound location associated with a permissible code change location.

The automotive computer 245 may be or include an electronic vehicle controller, having one or more processor(s) 250 and memory 255. The automotive computer 245 may, in some example embodiments, be disposed in communication with the mobile device 220, and one or more server(s) 270. The server(s) 270 may be part of a cloud-based computing infrastructure and may be associated with and/or include a Telematics Service Delivery Network (SDN) that provides digital data services to the vehicle 205 and other vehicles (not shown in FIG. 2) that may be part of a vehicle fleet.

Although illustrated as a sport utility, the vehicle 205 may take the form of another passenger or commercial automobile such as, for example, a car, a truck, a high performance vehicle, a crossover vehicle, a van, a minivan, a taxi, a bus, etc., and may be configured and/or programmed to include various types of automotive drive systems. In other aspects, the vehicle 205 may further be an aerial vehicle or nautical vehicle such as an aircraft or boat. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 205 may be configured as an electric vehicle (EV). More particularly, the vehicle 205 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 205 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 205 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include driver assistance or autonomous driving features. An autonomous vehicle (AV) that includes driver assist technologies may be characterized as Level-1 autonomy, and may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 driver assist features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 AVs can operate independently from a human driver, but may still include human controls for override operation. Level-4 automation may also enable a self-driving mode to intervene responsive to a predefined conditional trigger, such as a road hazard or a system failure.

Level-5 vehicle autonomy is associated with autonomous vehicle systems that require no human input for operation, and may not include human operational driving controls.

According to embodiments of the present disclosure, the biometric wireless vehicle entry system 107 may be configured and/or programmed to operate with a vehicle having a Level-0 to Level-5 autonomous vehicle controller. Accordingly, the biometric wireless vehicle entry system 107 may provide some aspects of human control to the vehicle 205, when the vehicle is configured as an AV.

The mobile device 220 can include a memory 223 for storing program instructions associated with an application 235 that, when executed by a mobile device processor 221, performs aspects of the disclosed embodiments. The application (or "app") 235 may be part of the biometric wireless vehicle entry system 107, or may provide information to the biometric wireless vehicle entry system 107 and/or receive information from the biometric wireless vehicle entry system 107.

In some aspects, the mobile device 220 may communicate with the vehicle 205 through the one or more wireless connection(s) 230, which may be encrypted and established between the mobile device 220 and a Telematics Control Unit (TCU) 260. The mobile device 220 may communicate with the TCU 260 using a wireless transmitter (not shown in FIG. 2) associated with the TCU 260 on the vehicle 205. The transmitter may communicate with the mobile device 220 using a wireless communication network such as, for example, the one or more network(s) 225. The wireless connection(s) 230 are depicted in FIG. 2 as communicating via the one or more network(s) 225, and via one or more wireless connection(s) 233 that can be direct connection(s) between the vehicle 205 and the mobile device 220. The wireless connection(s) 233 may include various low-energy protocols including, for example, Bluetooth®, Bluetooth® Low-Energy (BLE®), UWB, Near Field Communication (NFC), or other protocols.

The network(s) 225 illustrate an example communication infrastructure in which the connected devices discussed in various embodiments of this disclosure may communicate. The network(s) 225 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 245 may be installed in an engine compartment of the vehicle 205 (or elsewhere in the vehicle 205) and operate as a functional part of the biometric wireless vehicle entry system 107, in accordance with the disclosure. The automotive computer 245 may include one or more processor(s) 250 and a computer-readable memory 255.

The one or more processor(s) 250 may be disposed in communication with one or more memory devices disposed in communication with the respective computing systems (e.g., the memory 255 and/or one or more external databases not shown in FIG. 2). The processor(s) 250 may utilize the memory 255 to store programs in code and/or to store data for performing aspects in accordance with the disclosure. The memory 255 may be a non-transitory computer-readable memory storing a biometric vehicle entry program code. The memory 255 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 265 may share a power bus 278 with the automotive computer 245, and may be configured and/or programmed to coordinate the data between vehicle 205 systems, connected servers (e.g., the server(s) 270), and other vehicles (not shown in FIG. 2) operating as part of a vehicle fleet. The VCU 265 can include or communicate with any combination of the ECUs 217, such as, for example, a Body Control Module (BCM) 293, an Engine Control Module (ECM) 285, a Transmission Control Module (TCM) 290, the TCU 260, a Driver Assistances Technologies (DAT) controller 299, etc. The VCU 265 may further include and/or communicate with a Vehicle Perception System (VPS) 281, having connectivity with and/or control of one or more vehicle sensory system(s) 282. In some aspects, the VCU 265 may control operational aspects of the vehicle 205, and implement one or more instruction sets received from the application 235 operating on the mobile device 220, from one or more instruction sets stored in computer memory 155 of the automotive computer 245, including instructions operational as part of the biometric wireless vehicle entry system 107.

The TCU 260 can be configured and/or programmed to provide vehicle connectivity to wireless computing systems onboard and offboard the vehicle 205, and may include a Navigation (NAV) receiver 288 for receiving and processing a GPS signal from the GPS 275, a BLE® Module (BLEM) 295, a Wi-Fi transceiver, a UWB transceiver, and/or other wireless transceivers (not shown in FIG. 2) that may be configurable for wireless communication between the vehicle 205 and other systems, computers, and modules. The TCU 260 may be disposed in communication with the ECUs 217 by way of a bus 280. In some aspects, the TCU 260 may retrieve data and send data as a node in a CAN bus.

The BLEM 295 may establish wireless communication using Bluetooth® and BLE® communication protocols by broadcasting and/or listening for broadcasts of small advertising packets, and establishing connections with responsive devices that are configured according to embodiments described herein. For example, the BLEM 295 may include Generic Attribute Profile (GATT) device connectivity for client devices that respond to or initiate GATT commands and requests, and connect directly with the mobile device 220, and/or one or more keys (which may include, for example, the fob 279).

The bus 280 may be configured as a Controller Area Network (CAN) bus organized with a multi-master serial bus standard for connecting two or more of the ECUs 217 as nodes using a message-based protocol that can be configured and/or programmed to allow the ECUs 217 to communicate with each other. The bus 280 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 217 may communicate with a host computer (e.g., the automotive computer 245, the biometric wireless vehicle entry system 107, and/or the server(s) 270, etc.), and may also communicate with one another without the necessity of a host computer. The bus 280 may connect the ECUs 217 with the automotive computer 245 such that the automotive computer 245 may retrieve information from, send information to, and otherwise interact with the ECUs 217 to perform steps described according to embodiments of the present disclosure. The bus 280 may connect CAN bus nodes (e.g., the ECUs 217) to each other through a two-wire bus, which may be a twisted pair having a nominal characteristic impedance. The bus 280 may also be accomplished using other communication protocol solutions, such as Media Oriented Systems Transport (MOST) or Ethernet. In other aspects, the bus 280 may be a wireless intra-vehicle bus.

The VCU 265 may control various loads directly via the bus 280 communication or implement such control in conjunction with the BCM 293. The ECUs 217 described with respect to the VCU 265 are provided for example purposes only, and are not intended to be limiting or exclusive. Control and/or communication with other control modules not shown in FIG. 2 is possible, and such control is contemplated.

In an example embodiment, the ECUs 217 may control aspects of vehicle operation and communication using inputs from human drivers, inputs from an autonomous vehicle controller, the biometric wireless vehicle entry system 107, and/or via wireless signal inputs received via the wireless connection(s) 233 from other connected devices such as the mobile device 220, among others. The ECUs 217, when configured as nodes in the bus 280, may each include a central processing unit (CPU), a CAN controller, and/or a transceiver (not shown in FIG. 2). For example, although the mobile device 220 is depicted in FIG. 2 as connecting to the vehicle 205 via the BLEM 295, it is possible and contemplated that the wireless connection 233 may also or alternatively be established between the mobile device 220 and one or more of the ECUs 217 via the respective transceiver(s) associated with the module(s).

The BCM 293 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 293 may also operate as a gateway for bus and network interfaces to interact with remote ECUs (not shown in FIG. 2).

The BCM 293 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 293 may be configured for vehicle energy management, exterior lighting control, wiper functionality, power window and door functionality, heating ventilation and air conditioning systems, and driver integration systems. In other aspects, the BCM 293 may control auxiliary equipment functionality, and/or be responsible for integration of such functionality.

In some aspects, the vehicle 205 may include one or more Door Access Panels (DAPs) 291 disposed on exterior door surface(s) of vehicle door(s) 298. The DAP 291 may include, in one embodiment, the biometric wireless keypad 105. The DAP 291, which may operate and/or communicate with the BCM 293 or another of the ECUs 217, can include and/or connect with an interface with which a ride-hail passenger, user, (or any other user such as the user 240) may input identification credentials and receive information from the system. In one aspect, the interface may be or include a DAP 291 disposed on a vehicle door 298, and can include an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. Accordingly, it should be appreciated that, although a DAP is described with respect to embodiments herein, the DAP may exist as a separate access control component with respect to the biometric wireless keypad 105, such that the biometric wireless keypad 105 is isolated from all wired vehicle systems. Further, the DAP or other variants of biometric wireless keypads may be mounted with buttons is a vertical row or a horizontal row or angles of inclination in between.

Figure 4:
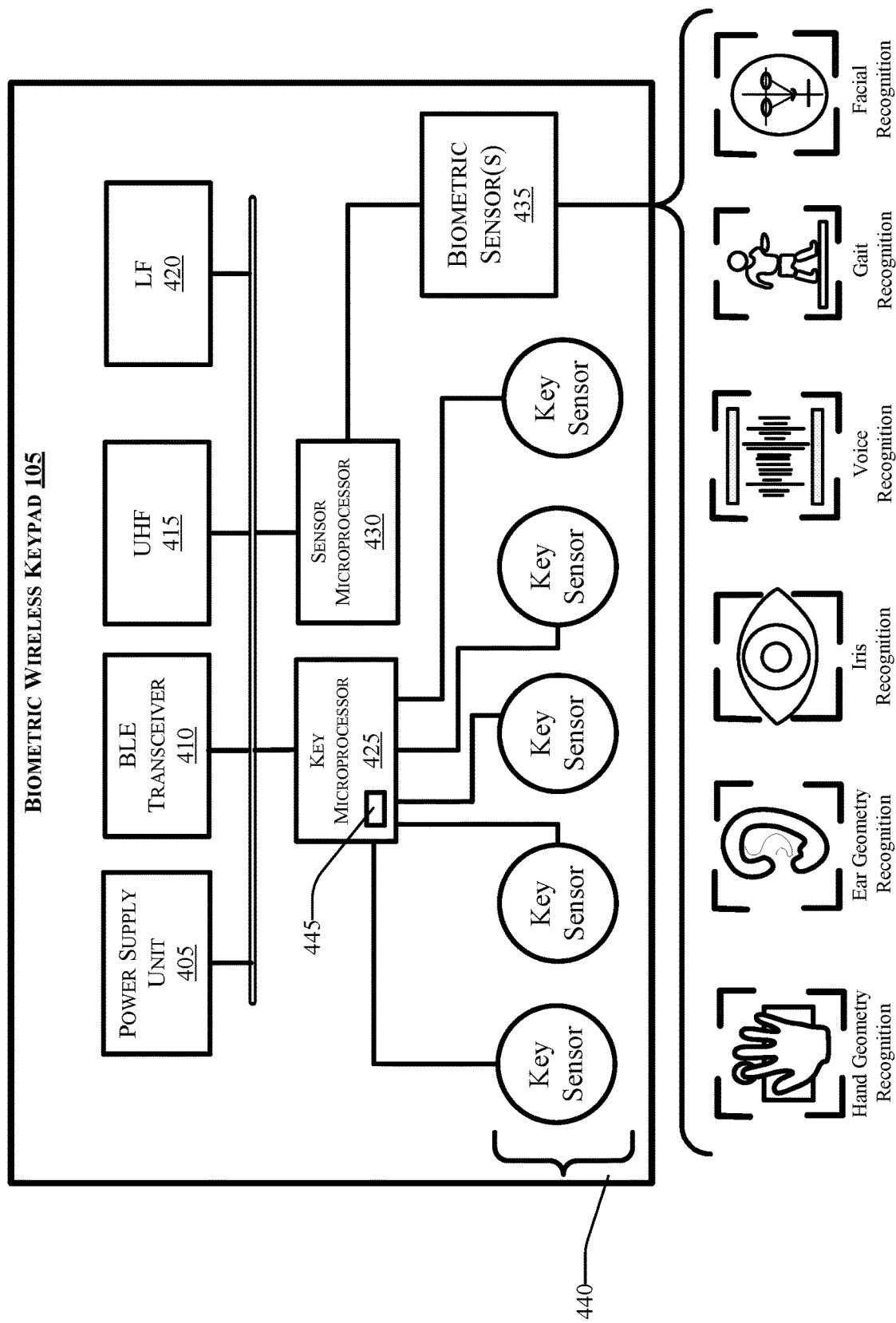
FIG. 4 depicts a functional schematic of the example vehicle wireless entry keypad in accordance with the present disclosure.

The biometric wireless keypad 105, as discussed in greater detail with respect to FIG. 4, may connect with the BLEM® 295, and is self-contained from the rest of the vehicle 205, where the only communication to the "key" circuitry (not shown in FIG. 2) may be passing an authentication token (token not shown in FIG.2) whenever a valid fingerprint is recognized. To enable the enrollment in the vehicle 205, the key circuitry may receive the cryptographically secured template and pass it internally to the biometric sensor chipset.

Figure 5:
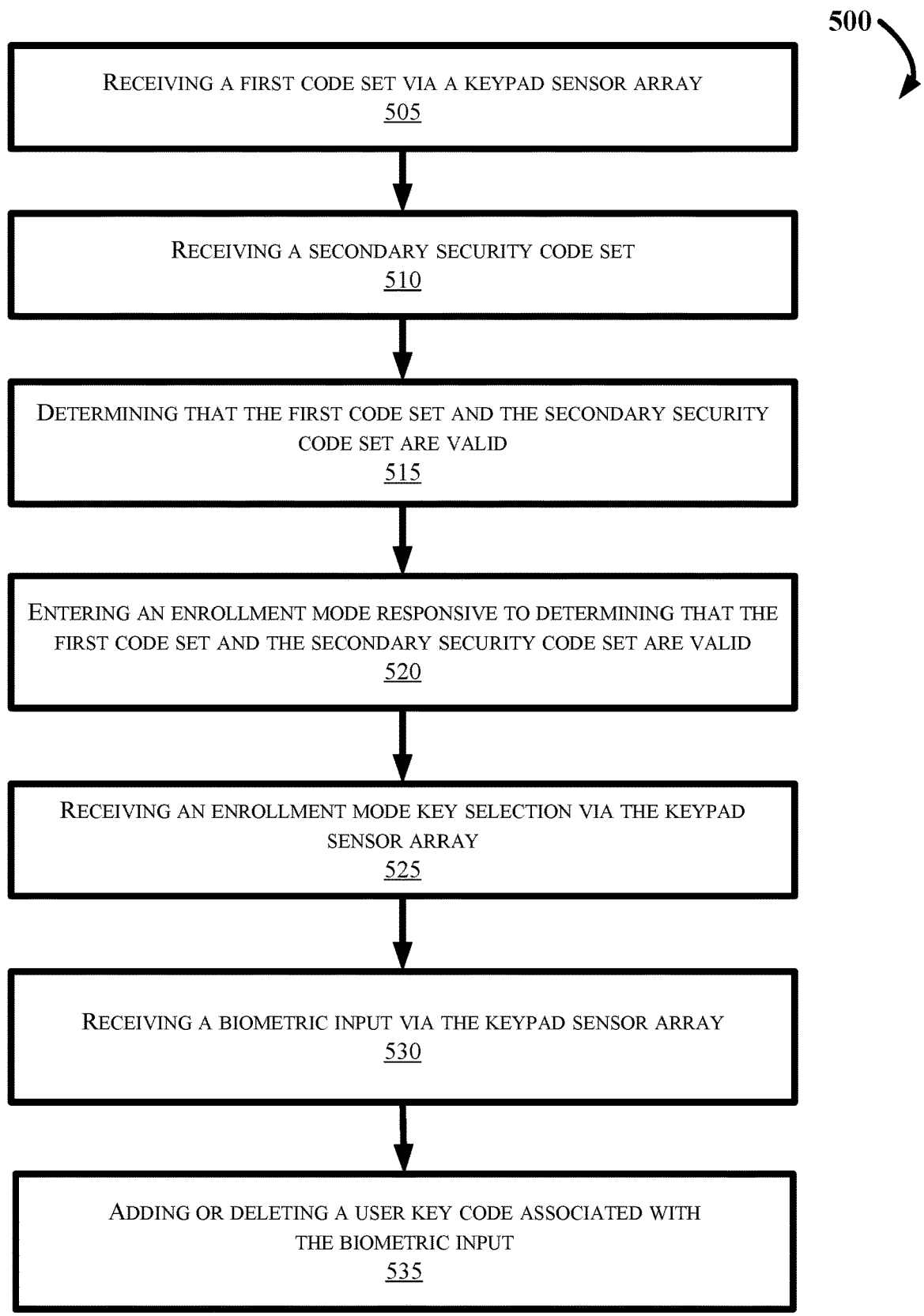
FIG. 5 depicts a flow diagram of an example method for configuring a biometric wireless vehicle entry system in accordance with the present disclosure.
Figure 6D:
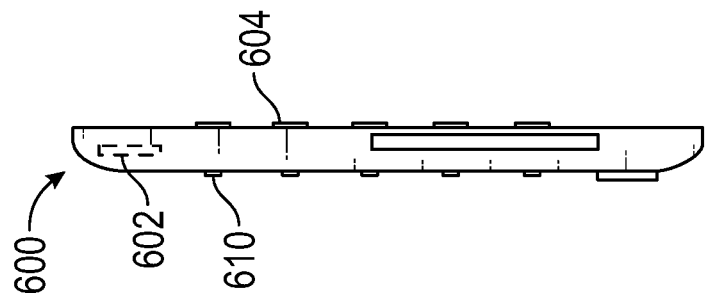
FIGS. 6A-6D illustrate example biometric vehicle entry wireless keypad overlays in accordance with the present disclosure.
Figure 6B:
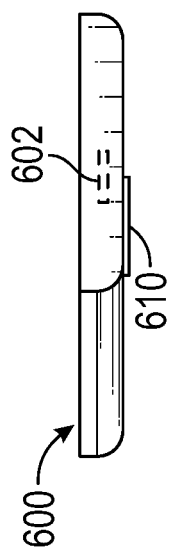
Figure 6C:
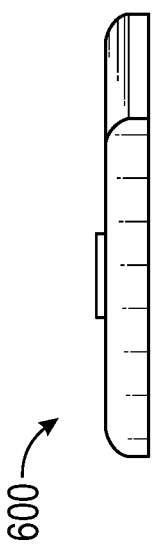
Figure 6A:
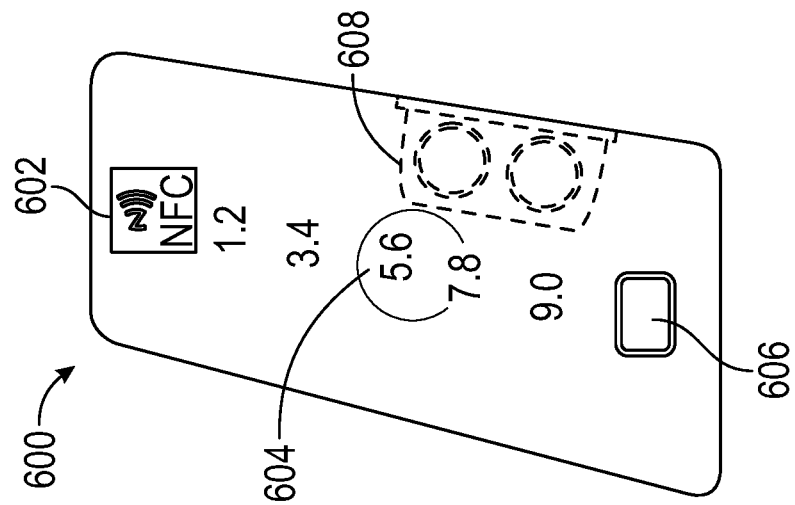

The BCM 293, described in greater detail with respect to FIG. 5, can include sensory and processor functionality and hardware to facilitate user and device authentication, and provide occupant customizations and support that provide customized experiences for vehicle occupants. The BCM 293 may connect with a Driver Assist Technologies (DAT) controller 299 configured and/or be programmed to provide biometric authentication controls, including, for example, facial recognition, fingerprint recognition, voice recognition, and/or other information associated with characterization, identification, and/or verification for other human factors such as gait recognition, body heat signatures, eye tracking, etc.

The DAT controller 299 may provide Level-1 through Level-3 automated driving and driver assistance functionality that can include, for example, active parking assistance, trailer backup assistance, adaptive cruise control, lane keeping, and/or driver status monitoring, among other features. The DAT controller 299 may also provide aspects of user and environmental inputs usable for user authentication. Authentication features may include, for example, biometric authentication and recognition for vehicle services other than the biometric vehicle entry system 107.

The vehicle PaaK system (not shown in FIG. 2) determines and monitors a location of a PaaK-enabled mobile device relative to the vehicle location in order to time broadcasting a pre-authentication message to the mobile device 220, or other passive key device such as the fob 279. For example, the fob 279 may include one or more transmitters (not shown in FIG. 2) and/or one or more transceivers (not shown in FIG. 2). The PaaK system may determine and monitor a location of the passive key device by sending and/or receiving a signal to/from the fob 279.

As the mobile device 220 approaches a predetermined communication range relative to the vehicle position, the mobile device may transmit a preliminary response message to the PaaK-enabled vehicle. The vehicle PaaK system may cache the preliminary response message until a user associated with the authenticating device performs an unlock action such as actuating a vehicle door latch/unlatch mechanism by pulling or touching a door handle, for example. The PaaK system may unlock the door using data already sent to the pre-processor to perform a first level authentication without the delay associated with full authentication steps. In some aspects, the PaaK system may authenticate a user via the passive device, and pass a token to the biometric wireless keypad 105 as the secondary security factor sequence (Step 3 as discussed in FIG. 1).

Prior to actuation of the door latch (not shown in FIG. 2), the PaaK system may perform authentication confirmation using a secure processor, by transmitting, to the requesting device (e.g., the biometric wireless keypad 105) a challenge value requiring a validation response from the requesting device, and authenticating responsive validation messages using the secure processor. Responsive messages that correctly answer the validation message may confirm authenticity of the biometric wireless keypad 105, and prevent signal spoofing attacks that may try to mimic an authenticated device.

The processor(s) 250 may provide initial access to the vehicle 205 when the mobile device 220 is within the Passive Entry Passive Start (PEPS) zone, and in some embodiments, when the mobile device 220 is within the PEPS zone and the biometric wireless vehicle entry system 107 performs an independent authentication as described in FIG. 1. For example, the processor(s) 250 may generate a secure processor initialization instruction responsive to a door latch opening, or a user touching the sensory area of a door handle or entry keypad on the biometric wireless keypad 105, or presence detection through cameras or other electromagnetic sensing. The processor(s) 250 may receive a sensor output that indicates an attempt to enter the vehicle.

The handle touch, by itself, would not trigger an unlock instruction. Rather, in an example embodiment, the touch to the door handle 296, plus the proximity indication associated with the position of the mobile device 220 with respect to the vehicle 205, may cause a door handle sensor (not shown in FIG. 2) to transmit sensor output to the processor(s) 250. The processor(s) 250 may receive the vehicle sensor output associated with the actuation of the door handle 296 (and more precisely, associated with an actuation of a door latch mechanism (not shown in FIG. 2) of the door handle 296), and generate a secure processor initialization instruction to the secure processor(s) 250 in response.

The processor(s) 250 may also provide access to the vehicle 205 in conjunction with the secure processor(s) 250 by unlocking the door 298, based on the key-on request and/or the authentication message (key-on request and authentication message not shown in FIG. 2) received from the biometric wireless vehicle entry system 107, by comparing the authentication message (token) with the first code set and/or the secondary security code set, etc. The secure processor initialization instruction may initialize the secure processor(s) 250, by sending instructions that "wake up" the secure processor(s) 250 by changing a power mode profile from a low-energy state to a higher-energy state. Once initialized, the secure processor(s) 250 may verify the authentication message before unlocking the door 298.

More particularly, there may be at least two ways the biometric wireless keypad provides an unlock signal: First, upon authentication, the biometric wireless keypad may send an RF message, similar to Remote Entry. In another aspect, upon authentication, the system may reveal a key fob circuit that includes LF for localization at the door. The transceivers on the keypad are matched in some embodiments such that, LF localization at the door may require only an RF message, (e.g., BLE, UHF, etc.). In another aspect, if the unlock signal is a key circuit, the system may require need an LF signal for a vehicle unlock command and an RF signal for programming purposes.

The computing system architecture of the automotive computer 245, VCU 265, and/or the biometric wireless vehicle entry system 107 may omit certain computing modules. It should be readily understood that the computing environment depicted in FIG. 2 is an example of a possible implementation according to the present disclosure, and thus, it should not be considered limiting or exclusive.

The automotive computer 245 may connect with an infotainment system 210 that may provide an interface for the navigation and GPS receiver 288, and the dynamic navigation coach system 207. The infotainment system 210 may include a touchscreen interface portion 211, and may include voice recognition features and biometric identification capabilities that can identify users based on facial recognition, voice recognition, fingerprint identification, or other biological identification means. In other aspects, the infotainment system 210 may provide user identification using mobile device pairing techniques (e.g., connecting with the mobile device 220, a Personal Identification Number (PIN) code), a password, passphrase, or other identifying means.

The DAT controller 299 can obtain input information via the sensory system 282, which may include sensors disposed on the vehicle interior and/or exterior (sensors not shown in FIG. 2). The DAT controller 299 may receive the sensor information associated with driver functions, vehicle functions, and environmental inputs, and other information, and characterize the sensor information for identification of biometric markers stored in a secure biometric data vault (not shown in FIG. 2) onboard the vehicle 205 and/or via the server(s) 270. Biometric authentication performed by the DAT controller 299 may be independent from the authentication steps associated with the biometric wireless vehicle entry system 107, according to embodiments of the present disclosure.

In other aspects, the DAT controller 299 may also be configured and/or programmed to control Level-1 and/or Level-2 driver assistance when the vehicle 205 includes Level-1 or Level-2 autonomous vehicle driving features. The DAT controller 299 may connect with and/or include a Vehicle Perception System (VPS) 281, which may include internal and external sensory systems (collectively referred to as sensory systems 281). The sensory systems 282 may be configured and/or programmed to obtain sensor data usable for biometric authentication that is not associated with the biometric wireless vehicle entry system 107, and for performing driver assistance operations such as, for example, active parking, trailer backup assistance, adaptive cruise control and lane keeping, driver status monitoring, and/or other features.

FIGS. 3A-3C illustrate examples of biometric wireless keypads 105A-105C, in accordance with the present disclosure. As shown in FIG. 3A, an example biometric wireless keypad 105A includes a vision biometrics sensor 305, which may be configured and/or programmed to obtain facial features via one or more image frames. The vision biometrics sensor 305 may be a Red-Green-Blue (RGB) camera capture system, a 4 pixel RGB/IR sensor, monochrome camera system, infrared (thermal) device, or another camera device. The biometric wireless keypad 105A may include facial recognition software programmed to measure the geometry of the user's 240 face, including the distance between the eyes, the distance from the chin to the forehead, and multiple other points on the face. After collecting the data, the biometric wireless keypad may utilize an algorithm to transform image features into an encrypted facial signature.

In another example, the facial recognition sensor may instead be configured as a gait detection sensor, with which the biometric wireless keypad 105A may record the gait of an approaching user, and authenticate the user's gait in lieu of the biometric input described with respect to FIG. 1 at Step 7.

FIG. 3B depicts another example biometric wireless keypad 105B that includes a voice recognition sensor 310 that may be configured and/or programmed to receive a vocal print of the user 140, authenticate the voice print, and substitute the voice print as the biometric input described with respect to FIG. 1 at Step 7.

FIG. 3C depicts an example biometric wireless keypad 105C, which may be substantially similar or identical to the biometric wireless keypad 105 described in prior sections. The biometric wireless keypad 105C may include the fingerprint sensor 113.

Although FIGS. 3A-3C depict three example embodiments for configuration of the biometric wireless keypad 105, it should be appreciated that the keypad module may take any form, include more or less keys, and may be configured in different shapes and sizes.

FIG. 4 depicts a functional schematic of the example biometric wireless keypad 105, in accordance with the present disclosure. According to embodiments described herein, the biometric wireless keypads 105, 105A, 105B, and 105C may include circuitry and components similar or identical to those described with respect to FIG. 4. As explained above, the biometric wireless vehicle entry system 107 can include the biometric wireless keypad 105, which may take various shapes and configurations. In all cases, the biometric wireless keypad 105 may include an independent power supply unit 405 that remains separate from the vehicle power bus 278 (depicted in FIG. 2) to maintain security features and avoid signal spoofing and other types of attacks. The power supply unit 405 may be a battery cell, or another independent power supply as known in the art.

The biometric wireless keypad 105 may further include a BLE transceiver and antenna 410, an ultra-high frequency (UHF) transceiver and antenna 415, and a low frequency (LF) receiver and antenna 420. The power supply unit 405 may source power to the biometric wireless keypad 105 via a single or two-wire pigtail connector (not shown in FIG. 4), which may add a permanent power source.

According to an embodiment, the key microprocessor 425 may provide encryption key and authentication processing, and may include ROM 445, which may store all biometric authentication data such as, for example, fingerprints, voice prints, facial recognition data, etc. The system ROM 445 may allow an external computer to command whether the circuit should add new fingerprints, authenticate fingerprints, or delete fingerprints—however, direct access of images is not permitted. For example, the external computer may communicate fingerprint information to the biometric keypad via a wireless BLE connection. The external computer may be the mobile device 220 running the application 235, or the vehicle's infotainment system 210 running an instantiated version of the application 235 (not shown in FIG. 2). In another embodiment, the external computer may be and/or include a diagnostic tool operated by a vehicle dealer (not shown in FIG. 4) configured and/or programmed to interface with the biometric wireless keypad 105 via an encrypted BLE connection, or over an encrypted LF/UHF connection (not shown in FIG. 4). For example, the dealer may utilize the diagnostic tool to obtain a user biometric data set (e.g., voice recording, fingerprint, facial feature scan, etc.) and flash the data set to the ROM 445.

The key microprocessor 425 may manage all security through hardware distribution and soft token requirements. The key microprocessor 425 may perform all processing of biometric data to the fingerprint system, and implement a soft token requirement configured and/or programmed to prevent bad actors from gaining access to the vehicle 205 by plugging the circuit depicted in FIG. 4 to another power source. The token may include an encrypted value known only by the key microprocessor 425. The key microprocessor 425 may further include program instructions that automatically destroy the token via an interrupt after a predetermined period of time (e.g., 20 seconds, 1 minute, 5 minutes, etc.) to ensure the key would be only useful after authentication by the paired fingerprint circuit.

In other aspects, the key microprocessor 425 may provide an instruction allowing a vehicle motive start when a vehicle start button (e.g., in the vehicle cabin interior and/or on a key fob) responsive to an actuation of the start button within the predetermined period of time (e.g., 15 seconds, 18 seconds, 30 seconds, etc.) of an NFC unlock disposed on the vehicle exterior. In some example embodiments, this feature may begin countdown from an electronic unlock event, and/or from a biometric wireless keypad 107 unlock event.

A plurality of key sensors 440 may be embedded in a keypad application (not shown in FIG. 4). Examples of sensor types for the key sensors 440 can include ultrasonic, capacitive, and infra-red sensors, among others. The plurality of key sensors 440 may connect to the key microprocessor 425 via either a flexible circuit connector or wire, which performs the enrollment and authentication using input received from the plurality of key sensors 440. The biometric wireless keypad 105 may further include a plurality of color and/or monochrome LEDs (not shown in FIG. 4) for generating output confirmation and other tasks. Moreover, sound output means (not shown in FIG. 4) may be included, which may generate chimes, alerts, and other communication sounds indicative of steps described herein.

An exterior surface of the keypad 105 may be constructed of an injection molded button face, and/or may include capacitive keypad surfaces for actuating the biometric wireless keypad 105.

FIG. 5 is a flow diagram of an example method 500 for configuring the biometric wireless vehicle entry system 107, according to the present disclosure. FIG. 5 may be described with continued reference to elements depicted and discussed in prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

Referring first to FIG. 5, at step 505, the method 500 may commence with receiving a first code set via a keypad sensor array.

At step 510, the method 500 may further include receiving a secondary security code set. The secondary security code set may include a challenge code and/or include a second code set entered via the keypad sensor array. In one aspect, this step may include receiving a series of button actuations that can include one or more multiple and simultaneous button depressions as part of the code set series (e.g., buttons 1+5 pushed simultaneously, 3, 6, buttons 5+0 pushed simultaneously . . . etc.). In other aspects, the method may include receiving the second code, either additionally or alternatively, via a passive device, a smartphone, or other device configured for secure communication with the wireless biometric vehicle entry system.

At step 515, the method 500 may further include determining that the first code set and the secondary security code set are valid. This step may include comparing a stored first code set and a stored secondary security code set, both stored in the key microprocessor, with the received first code set and received secondary security code set.

At step 520, the method 500 may further include entering an enrollment mode responsive to determining that the first code set and the secondary security code set are valid. This step may include engaging a visual feedback confirmation of an addition or a deletion of a user key.

At step 525, the method 500 may further include receiving an enrollment mode key selection via the keypad sensor array. This step may include receiving a key selection indicative of one of several enrollment/learning mode options, including a first enrollment control code for adding a new user biometric input, a second enrollment control code for deleting a user biometric input, and a third enrollment control code for deleting all user biometric inputs stored in the wireless biometric vehicle entry system. This step may further include illuminating a keypad light indicative of entering into the enrollment mode.

At step 530, the method 500 may further include receiving a biometric input via the keypad sensor array.

At step 535, the method 500 may include adding or deleting a user key code associated with the biometric input.

FIGS. 6A-6D illustrate the face, top, bottom, and a side view of an example biometric vehicle entry wireless keypad overlay 600 in accordance with the present disclosure. In one or more embodiments, the keypad overlay 600 (which may be in the form of a standalone keypad) may be mounted on top of a pre-existing keypad located on a vehicle (not shown in the figure). For example, some vehicles may include such keypads integrated into the B-Pillar (or any other location) of the vehicle that may allow a user to enter a code to gain entry to the vehicle.

In one or more embodiments, the keypad overlay 600 may also include one or more numerical pads 604 similar to numerical pads that may be included with a traditional keypad integrated into the vehicle. That is, both the existing keypad integrated into the vehicle and the keypad overlay 600 may include numerical pads. The numerical pads 604 may include physical buttons that may be depressed inwards based on an input pressure by a user. The numerical pads 604 may also alternatively not necessarily include physical buttons. For example, the numerical pads 604 may include a capacitive surface that may detect when a user touches a specific portion of the numerical pads 604 associated with a given number. Individual numerical pads may represent different numerical values that may allow a user to enter a code using the different numerical pads.

In one or more embodiments, the numerical pads 604 may be illuminated through a variety or combination of methods. For example, a user touch of the numerical pads 604 may generate either physical pressure on an associated existing keypad capacitive key or the keypad overlay 600 may activate a conductive circuit. Either of these resulting actions may cause LEDs in the existing keypad to activate. The numbers associated with the numerical pads 604 on the keypad overlay 600 may be made of photoluminescent materials that absorb sunlight during the day. The numbers associated with the numerical pads 604 on the keypad overlay 600 may have their own LED backlighting as well.

In one or more embodiments, the inputs provided by a user to the numerical pad of the second keypad may be reproduced on the existing keypad so that the vehicle may be able to recognize the inputs provided to the second keypad. The reproduction of the user input provided to the keypad overlay 600 may be performed in any number of different manners. For example, an input provided to the keypad overlay 600 may be electrically reproduced by the overlay 600 on the surface of the existing keypad for overlay units with an adequate power source. As a second example, the numeric pad of the second keypad may comprise a flexible material that may physically deflect and touch the existing keypad capacitive keys with a conductive material. The inputs provided to the second keypad that overlays the existing keypad may also be provided to the existing keypad through any other suitable mechanism as well.

In one or more embodiments, the keypad overlay 600 may also include a near-field communication (NFC) device 602. The NFC device 602 may be provided in any number of different forms (or combination of forms). For example, the NFC device 602 may be an antenna used to harvest energy from vehicle NFC transceiver device (for example, tuned for 13.56 MHz or any other frequency). The NFC device 602 may also be used to charge the keypad overlay 600. The NFC device 602 may also include a pass through with passive repeater antenna to allow an NFC reader included on an existing keypad to see NFC card of phones presented at the surface of the overlay 600.

In one or more embodiments, the keypad overlay 600 may also include a biometrics reader 606. The biometrics reader 606 may be configured to receive any number of different types of biometric inputs. For example, the biometrics reader 606 may include a fingerprint reader activated by mechanical pressure. As another example, the biometrics reader 606 may include a camera that may be activated by pushing any button. The camera may be used to capture an image or video of the user to perform facial and/or body recognition of the user. Once biometrics inputs are confirmed with values enrolled into the keypad overlay 600, the keypad overlay 600 may generate the appropriate code sequence for the existing keypad. The fingerprint reader may be ultrasonic or capacitive.

In one or more embodiments, the keypad overlay 600 may also include a power source 608. For vehicles without B-Pillar NFC readers, or to have stand-by power, a battery supply may be used. The battery tray may be sealed and on the device side of the keypad overlay 600 side facing away from an external environment.

FIGS. 7A-7E illustrate example biometric vehicle entry wireless keypads overlays in accordance with the present disclosure.

Figure 7C:
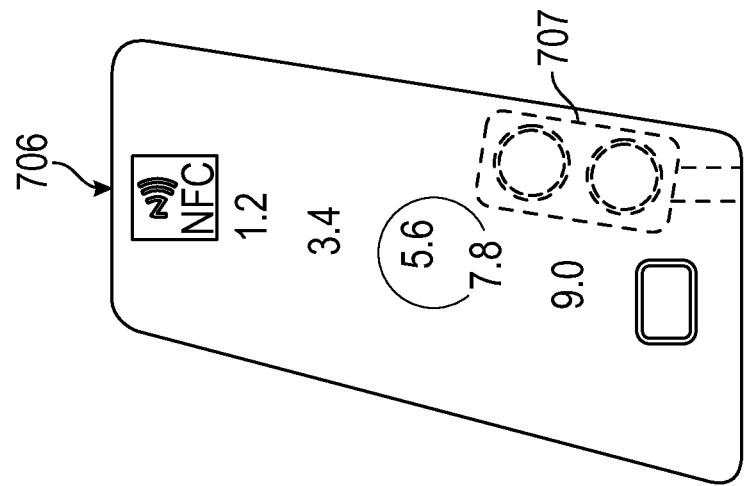
FIGS. 7A-7E illustrate example biometric vehicle entry wireless keypad overlays in accordance with the present disclosure.
Figure 7B:
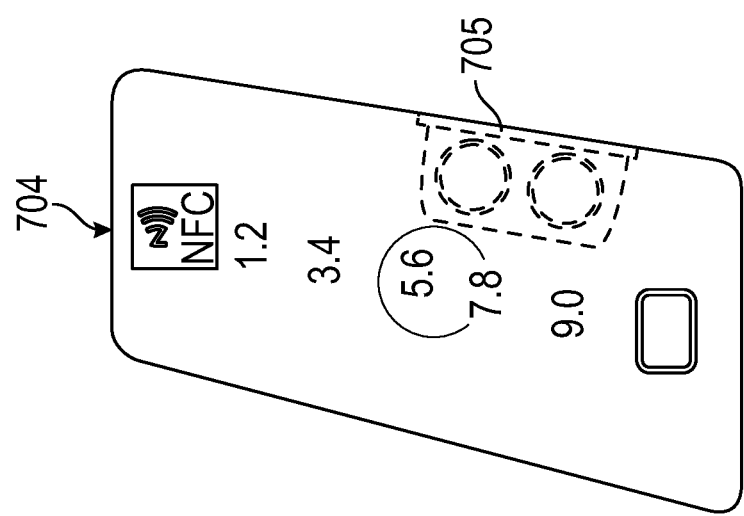
Figure 7A:
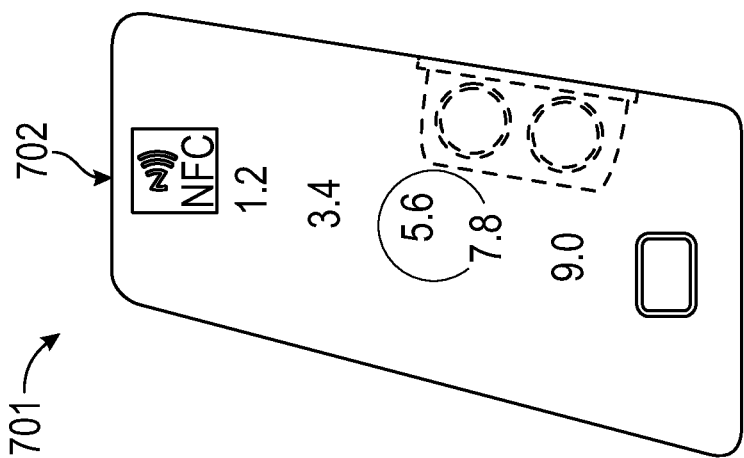
Figure 7E:
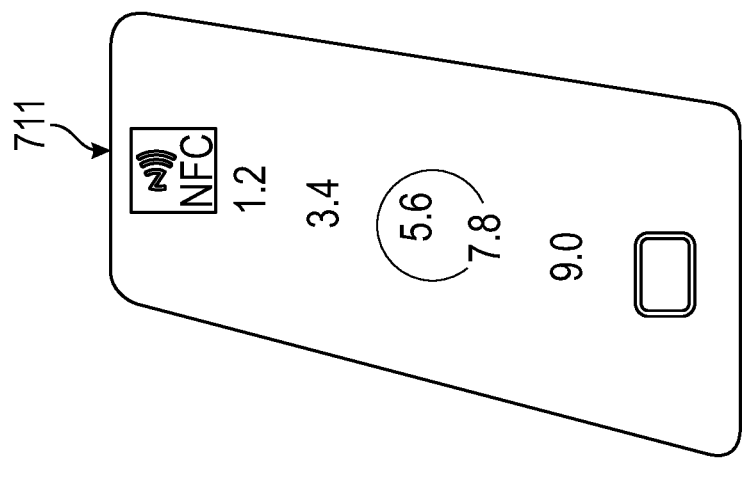
Figure 7D:
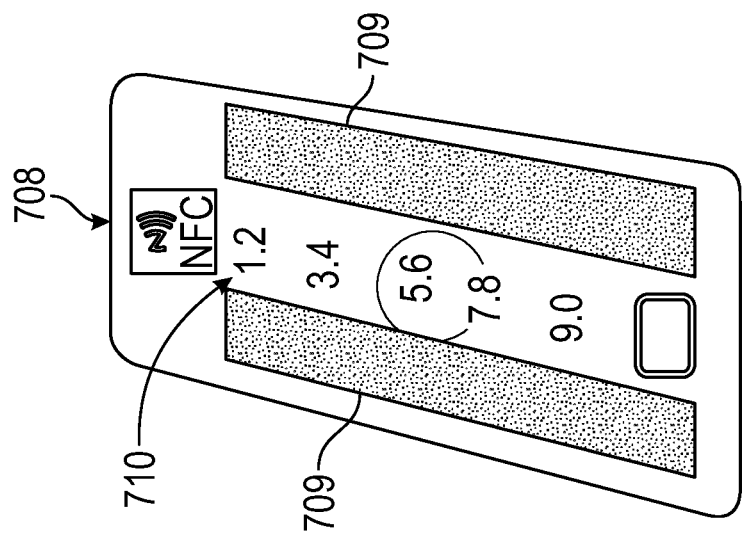

Particularly, FIGS. 7A-7E illustrate different types of power sources that may be used in association with a keypad overlay (for example, keypad overlay 701, keypad overlay 704, keypad overlay 706, keypad overlay 708, and/or keypad overlay 711, which may be the same as the keypad overlay 600 and/or any other keypad overlay described herein). FIG. 7A illustrates a first example keypad overlay 701 that harvests energy from an NFC device 702 (which may be the same as the NFC device 602 or any other NFC device) integrated into the existing keypad on the vehicle or mounted in the B-pillar just above the keypad. In one or more embodiments, the power may be obtained from an NFC transceiver located on the B-Pillar or in the existing keypad on which the keypad overlay 700 is mounted. The keypad overlay 701 may also allow an NFC card to be read (for example, via a passive repeater antenna). Activity on the keypad overlay 701 may ping an NFC device on the existing keypad. FIG. 7B illustrates a second example keypad overlay 704 that may include one or more coin cell batteries 705 (and/or any other types of batteries). The coin cell batteries 705 (or any other batteries) may be high-temperature resistant, long-life coin cell batteries mounted in a waterproof enclosure. FIG. 7C illustrates a third example keypad overlay 704 that may include a DC rechargeable power source 707. In one or more embodiments, the DC rechargeable power source 707 may allow for charging via a USB-C connection (as one non-limiting example). FIG. 7D illustrates a fourth example keypad overlay 704 that may include one or more solar cells 709. Although the figure illustrates two solar cells positioned on either side of the numerical pads 710, any other number of solar cells may be included on the keypad overlay 708 in any other location. FIG. 7E illustrates a fifth example keypad overlay 711 that may involve harvesting energy from LEDs located on the existing keypad. For example, solar cells on back side of the keypad overlay 711 may harvest light emitted by the LEDs on the existing keypad. Additionally, a storage supply may be utilized to build reserve of power. In some cases, the LEDs may be activated during drive mode logic via one or more G-sensors in the keypad overlay 711. Furthermore, RF harvesting of Bluetooth or Wi-Fi signals (for example, 2.4 GHz Wi-Fi) generated by the vehicle, passing vehicles, pedestrians, or nearby businesses or infrastructure (as well as any other RF source), may be harvested and stored as means of powering the overlay device. These are merely example of manners in which RF harvesting may be performed and are not intended to be limiting in any way. For example, ultra wideband (UWB), Cellular, or low frequency (LF) bands may also be used as well (to list additional non-limiting options). The methods shown in examples 701 through 711, along with the RF harvesting method, may be combined as needed to meet power needs.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A wireless vehicle entry system comprising:
a first keypad integrated into an exterior of a vehicle, wherein the first keypad comprises a first numerical pad; and
a second keypad removably mounted on the first keypad, wherein the second keypad comprises a biometric reader, wherein the biometric reader comprises a fingerprint reader, voice recognition, or a camera, and wherein the biometric reader is configured to receive an input and, based on the input, input a numerical sequence on the first keypad to unlock the vehicle by changing connectivity of different circuits on the second keypad that interface with the first numerical pad of the first keypad.

2. The wireless vehicle entry system of claim 1, wherein the first keypad further comprises a first near-field communication (NFC) device, and wherein the second keypad further comprises a second NFC device.

3. The wireless vehicle entry system of claim 2, wherein the second keypad is configured to receive power from the first NFC device.

4. The wireless vehicle entry system of claim 1, wherein the second keypad further comprises at least one of a battery, a solar cell, or a rechargeable direct current (DC) power source, wherein the second keypad receives power from the battery, the solar cell, or the rechargeable DC power source.

5. The wireless vehicle entry system of claim 1, wherein the second keypad is further configured to receive power from a radio frequency (RF) source.

6. An overlay vehicle keypad comprising:
an overlay numerical pad; and
a biometric reader, wherein the overlay vehicle keypad is removably mounted onto an inner keypad integrated into an exterior of a vehicle, wherein the inner keypad comprises an inner numerical pad, wherein the biometric reader comprises a fingerprint reader, voice recognition, or a camera, and wherein the biometric reader is configured to receive an input and, based on the input, input a numerical sequence on the inner keypad to unlock the vehicle by changing connectivity of different circuits on the overlay numerical pad that interface with the inner numerical pad of the inner keypad.

7. The overlay vehicle keypad of claim 6, further comprising an overlay near-field communication (NFC) device.

8. The overlay vehicle keypad of claim 7, wherein the inner keypad further comprises an inner NFC device, wherein the overlay vehicle keypad is configured to receive power from the inner NFC device.

9. The overlay vehicle keypad of claim 6, further comprising at least one of a battery, a solar cell, or a rechargeable direct current (DC) power source, wherein the overlay vehicle keypad receives power from the battery, the solar cell, or the rechargeable DC power source.

10. The overlay vehicle keypad of claim 6, wherein the overlay vehicle keypad is further configured to receive power from a radio frequency (RF) source.

11. A method comprising:
- receiving a biometric reader via an overlay vehicle keypad, wherein the overlay vehicle keypad is removably mounted onto an inner keypad integrated into an exterior of a vehicle;
- receiving, by the biometric reader, a biometric input; and
- inputting, based on the input, a numerical sequence on the inner keypad to unlock the vehicle by changing connectivity of different circuits on the overlay vehicle keypad that interface with numerical keys of the inner keypad, wherein the biometric reader comprises a fingerprint reader, voice recognition, or a camera.

12. The method of claim 11, wherein the overlay vehicle keypad further comprises an overlay near-field communication (NFC) device, and wherein the inner keypad further comprises an inner NFC device.

13. The method of claim 12, wherein the overlay vehicle keypad is configured to receive power from the inner NFC device.

* * * * *